United States Patent
Kawamoto et al.

(10) Patent No.: US 12,244,009 B2
(45) Date of Patent: Mar. 4, 2025

(54) NON-AQUEOUS ELECTROLYTE RECHARGEABLE BATTERY

(71) Applicant: Panasonic Intellectual Property Management Co., Ltd., Osaka (JP)

(72) Inventors: Yasunobu Kawamoto, Osaka (JP); Masahiro Kinoshita, Tokushima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 657 days.

(21) Appl. No.: 17/430,083

(22) PCT Filed: Feb. 21, 2020

(86) PCT No.: PCT/JP2020/007021
§ 371 (c)(1),
(2) Date: Aug. 11, 2021

(87) PCT Pub. No.: WO2020/175360
PCT Pub. Date: Sep. 3, 2020

(65) Prior Publication Data
US 2022/0140335 A1 May 5, 2022

(30) Foreign Application Priority Data
Feb. 28, 2019 (JP) ................. 2019-035633

(51) Int. Cl.
*H01M 4/525* (2010.01)
*H01M 4/02* (2006.01)
*H01M 4/505* (2010.01)

(52) U.S. Cl.
CPC ........... *H01M 4/525* (2013.01); *H01M 4/505* (2013.01); *H01M 2004/021* (2013.01); *H01M 2004/028* (2013.01)

(58) Field of Classification Search
CPC ..... H01M 2004/021; H01M 2004/028; H01M 4/52; H01M 4/505; H01M 4/523–525; C01P 2004/50–60
(Continued)

(56) References Cited

U.S. PATENT DOCUMENTS

2010/0285366 A1 11/2010 Endoh
2015/0270545 A1* 9/2015 Axelbaum ............. C01G 53/50
429/223
2016/0006031 A1* 1/2016 Kaseda .................. H01M 4/505
429/223

FOREIGN PATENT DOCUMENTS

JP 6-325791 A 11/1994
JP 7-6763 A 1/1995
(Continued)

OTHER PUBLICATIONS

The Extended European Search Report dated Mar. 21, 2022, issued in counterpart EP Application No. 20762181.4. (7 pages).
(Continued)

*Primary Examiner* — Christian Roldan
*Assistant Examiner* — Robert Gene West
(74) *Attorney, Agent, or Firm* — WHDA, LLP

(57) ABSTRACT

The purpose of the present disclosure is to provide a non-aqueous electrolyte rechargeable battery that serves to improve the thermal stability of the lithium composite oxide while keeping degradation in the low-temperature characteristics of the battery under control. A non-aqueous electrolyte rechargeable battery involving one aspect of the present disclosure includes a cathode, an anode, and a non-aqueous electrolyte. The cathode includes a cathode current collector and a cathode laminate disposed on the cathode current collector. The cathode laminate includes a lithium composite oxide (30) composed of secondary particles (34) formed of aggregated primary particles (32).
(Continued)

Letting the average particle diameter of the primary particles (32) be d and the standard deviation in the particle-size distribution be σ, among the secondary particles (34) primary particles (32a) having a particle diameter greater than d+6σ are present.

8 Claims, 2 Drawing Sheets

(58) Field of Classification Search
USPC .......................................................... 429/223
See application file for complete search history.

(56) References Cited

FOREIGN PATENT DOCUMENTS

| | | |
|---|---|---|
| JP | 10-79250 A | 3/1998 |
| JP | 10-162825 A | 6/1998 |
| JP | 2002-211931 A | 7/2002 |
| JP | 2010-262826 A | 11/2010 |
| JP | 2011-105594 A | 6/2011 |
| JP | 2014-528891 A | 10/2014 |
| WO | 2013/025328 A2 | 2/2013 |
| WO | 2014/133064 A1 | 9/2014 |
| WO | 2018/026650 A1 | 2/2018 |

OTHER PUBLICATIONS

International Search Report dated Apr. 28, 2020, issued in counterpart International Application No. PCT/JP2020/007021 (2 pages).

\* cited by examiner

NON-AQUEOUS ELECTROLYTE RECHARGEABLE BATTERY

TECHNICAL FIELD

The present invention relates to a technique for a non-aqueous electrolyte secondary battery.

BACKGROUND ART

Recently, a non-aqueous electrolyte secondary battery comprising a positive electrode, a negative electrode, and a non-aqueous electrolyte has been widely used as a secondary battery providing high output and a large energy density, the non-aqueous electrolyte secondary battery allowing, for example, lithium ions to move between the positive electrode and negative electrode to charge and discharge.

Lithium complex oxides have been heretofore used as a positive electrode active material for forming a positive electrode of a non-aqueous electrolyte secondary battery. For example, Patent Literatures 1 to 5 disclose lithium complex oxides including primary particles with a prescribed particle size or secondary particles, which are agglomerated primary particles, with a prescribed particle size.

CITATION LIST

Patent Literature

PATENT LITERATURE 1: Japanese Unexamined Patent Application Publication No. Hei 6-325791
PATENT LITERATURE 2: Japanese Unexamined Patent Application Publication No. Hei 7-6763
PATENT LITERATURE 3: Japanese Unexamined Patent Application Publication No. Hei 10-79250
PATENT LITERATURE 4: Japanese Unexamined Patent Application Publication No. 2002-211931
PATENT LITERATURE 5: Japanese Unexamined Patent Application Publication No. 2014-528891

SUMMARY

Technical Problem

It is known that when a lithium complex oxide includes primary particles with a large particle size (a small specific surface area), the lithium complex oxide has improved heat stability. However, if a lithium complex oxide merely includes primary particles with a large particle size, a resulting non-aqueous electrolyte secondary battery has poor characteristics at low temperatures.

Then, it is an advantage of the present invention to provide a non-aqueous electrolyte secondary battery that includes a lithium complex oxide having improved heat stability and is prevented from having poor characteristics at low temperatures.

Solution to Problem

A non-aqueous electrolyte secondary battery of one aspect of the present disclosure includes: a positive electrode, a negative electrode, and a non-aqueous electrolyte, the positive electrode including a positive electrode current collector and a positive electrode mixture layer located on the positive electrode current collector, wherein the positive electrode mixture layer includes a lithium complex oxide in a form of secondary particles, each of the secondary particle being agglomerated primary particles, and the secondary particles includes a secondary particle in which a primary particle having a particle size larger than $d+6\sigma$ is present, wherein d represents an average value of particle sizes of the primary particles and $\sigma$ represents a standard deviation of a particle size distribution of the primary particles.

Advantageous Effects of Invention

According one aspect of the present invention, heat stability of a lithium complex oxide is improved, and also poor characteristics of a resulting non-aqueous electrolyte secondary battery at low temperatures is prevented.

DESCRIPTION OF EMBODIMENTS

An exemplary embodiment of the present disclosure will now be described with reference to the drawings.

Figure 1:
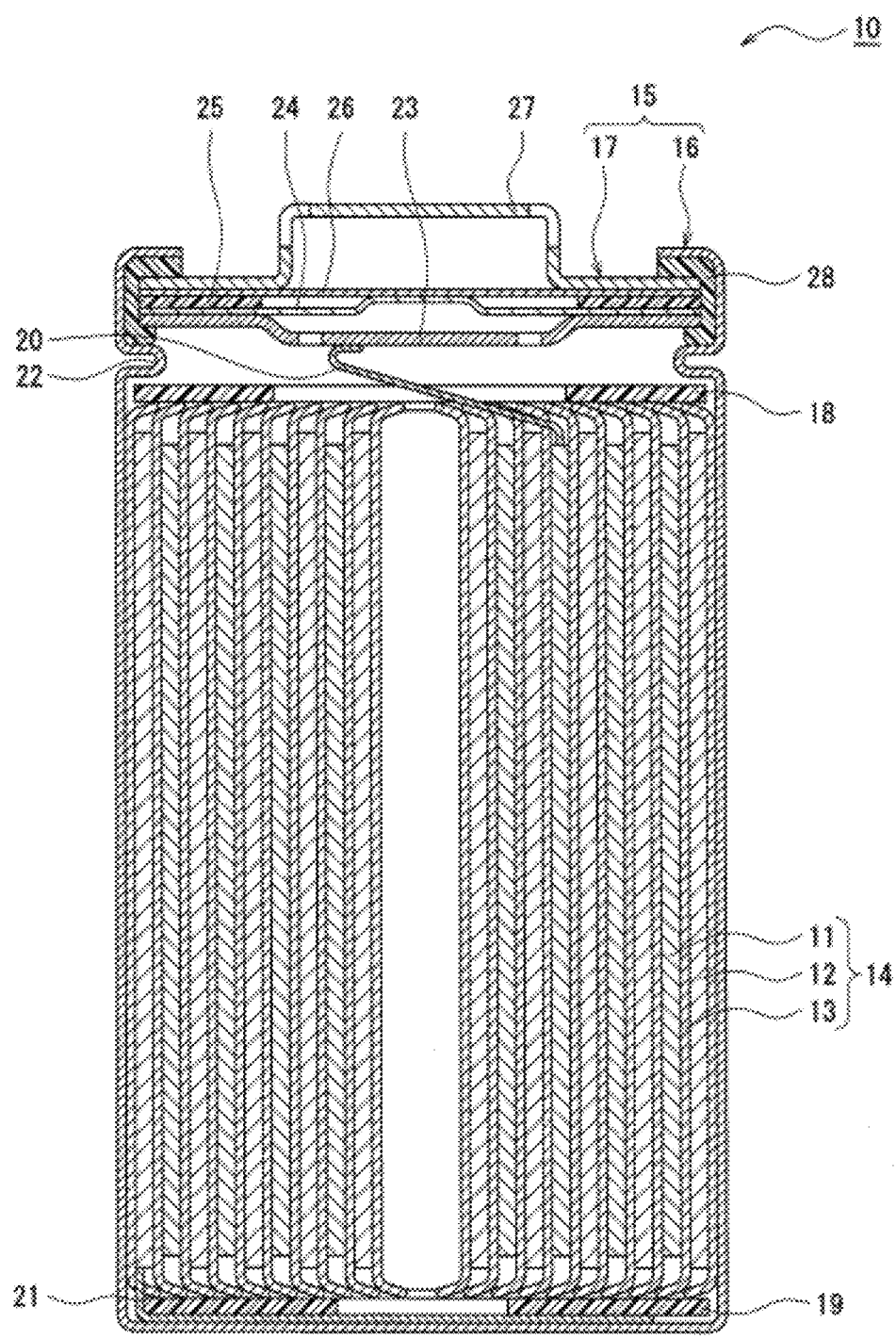
FIG. 1 is a schematic sectional view illustrating a non-aqueous electrolyte secondary battery of an exemplary embodiment.

FIG. 1 is a sectional view illustrating a non-aqueous electrolyte secondary battery of an exemplary embodiment. The non-aqueous electrolyte secondary battery 10 shown in FIG. 1 comprises: an electrode assembly 14 having a wound structure in which a positive electrode 11 and a negative electrode 12 are wound together with a separator 13 interposed therebetween; a non-aqueous electrolyte; insulating plates 18 and 19 disposed on the upper and lower sides, respectively, of the electrode assembly 14; and a battery case 15 housing these members. Alternatively to the electrode assembly 14 having a wound structure, an electrode assembly in another form may be applied, including an electrode assembly having a laminate structure in which positive electrodes and negative electrodes are laminated alternately with separators interposed therebetween.

The non-aqueous electrolyte includes a non-aqueous solvent and an electrolyte salt dissolved in the non-aqueous solvent. Example of the non-aqueous solvent to be used may include esters, ethers, nitriles, amides, and mixed solvents of two or more thereof. The non-aqueous solvent may include a halogen-substituted product formed by replacing at least one hydrogen atom of any of these solvents with a halogen atom such as fluorine. The non-aqueous electrolyte is not limited to a liquid electrolyte and may be a solid electrolyte. As the electrolyte salt, a lithium salt such as $LiPF_6$ is used, for example.

The battery case 15 is composed of a cylindrical case body 16 having a closed-end and a sealing assembly 17 to close the opening of the case body 16. The battery case 15 is not limited to those having a cylindrical shape, and may be a metallic case having a rectangular shape, a coin shape, a button shape, or another shape, or a case made of a laminated sheet formed by laminating a metal sheet and a resin sheet (for a laminate-type battery).

The case body 16 is, for example, a cylindrical metallic package having a closed-end. A gasket 28 is provided between the case body 16 and the sealing assembly 17 to ensure that the battery case is tightly sealed. The case body 16 includes a projecting portion 22 formed by, for example, pressing part of the lateral surface from outside to support the sealing assembly 17. The projecting portion 22 is preferably formed annularly along the circumferential direction of the case body 16, and the upper surface thereof supports the sealing assembly 17.

The sealing assembly 17 has a structure that includes the filter 23, a lower vent member 24, an insulating member 25, an upper vent member 26, and a cap 27, these members being piled in this order from the electrode assembly 14 side. Each of the members constituting the sealing assembly 17 has, for example, a disk or ring shape, and the members other than the insulating member 25 are electrically connected to each other. The lower vent member 24 and the upper vent member 26 are connected to each other at their middle portions and the insulating member 25 is interposed between their circumferences. If the internal pressure of the non-aqueous electrolyte secondary battery 10 increases by heat generation due to, for example, internal short, the lower vent member 24 changes its shape so as to, for example, push up the upper vent member 26 toward the cap 27 side, and the lower vent member 24 thus ruptures to break the electrical connection between the lower vent member 24 and the upper vent member 26. If the internal pressure further increases, the upper vent member 26 ruptures to discharge gas through the opening of the cap 27.

In the non-aqueous electrolyte secondary battery 10 shown in FIG. 1, a positive electrode lead 20 attached to the positive electrode 11 passes through a through-hole in the insulating plate 18 and extends toward the sealing assembly 17 side, and a negative electrode lead 21 attached to the negative electrode 12 passes through the outside of the insulating plate 19 and extends toward the bottom side of the case body 16. The positive electrode lead 20 is connected to the lower surface of the filter 23, which is the bottom board of the sealing assembly 17, by welding or the like, and the cap 27, which is the top board of the sealing assembly 17 electrically connected to the filter 23, serves as a positive electrode terminal. The negative electrode lead 21 is connected to the inner surface of the bottom of the case body 16 by welding or the like, and the case body 16 serves as a negative electrode terminal.

The positive electrode 11, the negative electrode 12, and the separator 13 will be described in detail below.

[Positive Electrode]

The positive electrode 11 includes, for example, a positive electrode current collector and a positive electrode mixture layer formed on the positive electrode current collector. As the positive electrode current collector, foil of a metal that is stable in the electric potential range of the positive electrode, such as aluminum, a film with such a metal disposed as an outer layer, or the like can be used.

The positive electrode mixture layer includes: a positive electrode active material including a lithium complex oxide; and optionally, a binder, a conductive agent and others.

Figure 2:
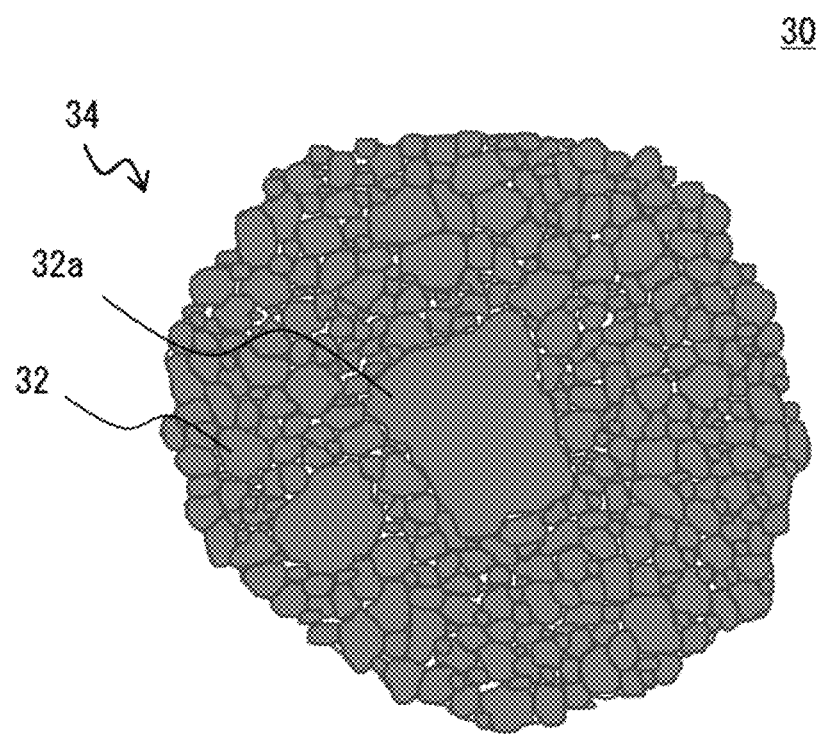
FIG. 2 is a schematic sectional view illustrating an exemplary lithium complex oxide used for the present embodiment.

FIG. 2 is a schematic sectional view illustrating an exemplary lithium complex oxide used for the present embodiment. As shown in FIG. 2, the lithium complex oxide 30 is in the form of secondary particles 34, each of the secondary particles 34 being agglomerated primary particles 32. Among the primary particles 32 included in the secondary particle 34, a coarse primary particle 32a is present, which has a much larger particle size than the average value of the particle sizes of the primary particles 32 (hereinafter, which may also referred to as the average particle size of the primary particles 32). The coarse primary particle 32a refers to a primary particle 32 having a particle size larger than $d+6\sigma$, wherein d represents the average value of the particle sizes of the primary particles 32 included in the secondary particle 34 and a represents the standard deviation of the particle size distribution of the primary particles 32.

As in the present embodiment, when a lithium complex oxide 30 including secondary particles 34 in which a coarse primary particle 32a having a particle size larger than $d+6\sigma$ is present is used, heat stability is improved, and also poor characteristics of a resulting non-aqueous electrolyte secondary battery 10 at low temperatures can be prevented. The mechanism for exhibiting the above-described effects is not clear; however, it is considered that the heat resistance of the secondary particle 34 is improved due to the presence of the coarse primary particle 32a to thereby improve the heat stability of the lithium complex oxide 30. It is also considered that because the reaction proceeds preferentially in primary particles 32 having a smaller particle size rather in the coarse primary particle 32a in charging/discharging at low temperatures, the influence of the coarse primary particle 32a is small, and that poor characteristics of the non-aqueous electrolyte secondary battery 10 at low temperatures is therefore prevented. In contrast, in secondary particles in which no coarse primary particle having a particle size larger than $d+6\sigma$ is present, heat stability can be increased when the average value of the particle sizes of primary particles is large; however, the reactivity of the particles at low temperatures is poor to thereby worsen the characteristics at low temperatures since the particle sizes of primary particles are large overall. Also, in secondary particles in which no coarse primary particle having a particle size larger than $d+6\sigma$ is present, the reactivity of the particles at low temperatures is improved to prevent poor characteristics at low temperatures, when the average value of the particle sizes of primary particles is small; however, heat resistance of the particles is reduced to thereby fail to improve heat stability since the particle sizes of primary particles are small overall.

For example, the average value of the particle sizes of the primary particles 32, d, is preferably within the range from 0.3 μm to 2.0 μm, in view of effectively preventing poor characteristics at low temperature and also improving heat stability.

Lithium complex oxide powder is embedded in a resin; a cross section of a particle of the lithium complex oxide powder is prepared by, for example, processing with a cross section polisher (CP); the cross section is observed under a SEM (scanning electron microscope); and at that time, the length of the primary particle in the major axis direction is measured as the particle size of the primary particle. The particle size of the primary particle (the length of the primary particle in the major axis direction) can be measured by image processing the SEM image by "Image analyzing particle size distribution measurement software Mac-View" manufactured by MOUNTECH Co. Ltd. The number of primary particles for measurement is 300 or more. If the number of primary particles included in a single secondary particle is less than 300, the particle sizes of 300 or more primary particles are measured on a plurality of secondary particles. From the found particle sizes of 300 or more primary particles, the particle size distribution and the average value of the particle sizes of the primary particles are calculated. Regarding the method for calculating the standard deviation of the particle size distribution, the standard deviation can be obtained by squaring the difference between the average value of the particle sizes of the primary particles and the particle size of each primary particle (=deviation) and extracting the square root of the total of these squares (=variance).

The particle size of the coarse primary particle 32a may be larger than d+6σ, and for example, is preferably larger than d+10σ, and more preferably larger than d+14σ, in view of improving heat stability of the lithium complex oxide 30 and preventing poor characteristics of the non-aqueous electrolyte secondary battery 10 at low temperatures.

At least one coarse primary particle 32a is present in the secondary particle 34, and the number of the coarse primary particles 32a is preferably within the range from 1 to 3. If the number of the coarse primary particles 32a in the secondary particle 34 is more than 3, the characteristics of a resulting non-aqueous electrolyte secondary battery 10 at low temperatures may be poor compared to that of a non-aqueous electrolyte secondary battery that fulfills the above-described range.

The average particle size of the secondary particles 34 is not particularly limited, however, it is preferably within the range from 3 μm to 20 μm, in view of improving heat stability and preventing poor characteristics at low temperatures, for example. The average particle size of the secondary particles 34 can be determined in the following manner. In the SEM image of the cross section of particles prepared in the above-described manner, twenty secondary particles are randomly selected, and the boundaries of the twenty particles selected are observed to determine the contour of each of the secondary particles. Then, the major axis of each of the twenty secondary particles is determined, and the average value thereof is used as the average particle size of the secondary particles.

For example, each of the secondary particles 34 is preferably composed of 300 or more primary particles, and more preferably composed of 300 to 1000 primary particles, per secondary particle. If the number of primary particles per secondary particle is too small, the secondary particles are finer, and if the number of primary particles per secondary particle is too large, the surface area is too large. In both cases, these may lead to poor charging/discharging cyclic characteristics, for example.

The lithium complex oxide 30 preferably includes, but not particularly limited to, a lithium/nickel complex oxide in view of, for example, large capacity of the resulting battery, and more preferably includes lithium/nickel complex oxide having a nickel content of 65 mol % or more based on the total molar amount of metal elements excluding lithium.

For example, the lithium/nickel complex oxide is preferably a lithium/nickel complex oxide represented by $Li_xNi_yM_{(1-y)}O_2$, wherein $0.95 \leq x \leq 1.10$, $0.65 \leq y \leq 1.0$, and M is at least one element selected from the group consisting of Co, Mn, Al, Mg, Ti, Sr, Zr, Y, Mo, and W.

For example, the content of the lithium complex oxide 30, which is in a form of secondary particles 34 in which a coarse primary particle 32a is present, is preferably within the range from 50 mass % to 100 mass %, and more preferably within the range from 80 mass % to 98 mass %, based on the total amount of the positive electrode active material. The positive electrode active material may include a lithium complex oxide in the form of secondary particles in which no coarse primary particle is present, as long as the effects of the present disclosure are not impaired.

For example, the content of the positive electrode active material is preferably 70 mass % or more and 99 mass % or less, and more preferably 80 mass % or more and 98 mass % or less, based on the total amount of the positive electrode mixture layer.

An exemplary method for producing the lithium complex oxide 30 used in the present embodiment will be described.

The lithium complex oxide can be obtained by, for example, mixing a transition metal material and a lithium material, firing the resulting mixture in an oxidizing environment, such as oxygen or air, for a predetermined time, and grinding the resulting fired product, if needed.

A lithium complex oxide in the form of secondary particles in which a coarse primary particle is present can be obtained by tailoring, for example, the shape of the particles of the transition metal material and the conditions of firing. Regarding the conditions of firing, the following stepwise firing is preferable, for example: firing at a low temperature is conducted at a low temperature region within the range from 200° C. to 400° C. for 1 to 3 hours, and then, firing at a high temperature is conducted at 600° C. to 800° C. for predetermined time. The form of the particles of the transition metal material is preferably an agglomerate of acicular crystal, for example. The above-described conditions are an exemplar for obtaining secondary particles in which a coarse primary particle is present, and conditions are not limited thereto.

Examples of the conductive agent included in the positive electrode mixture layer include carbon powders such as carbon black, acetylene black, Ketjenblack, and graphite. These may be used singly or in combinations of two or more thereof.

Examples of the binder included in the positive electrode mixture layer include fluororesin such as polyvinylidene fluoride (PVdF), PAN, polyimide resin, acrylic resin, polyolefin resin, styrene-butadiene rubber (SBR), carboxyinethyl cellulose (CMC) or its salt, polyacrylic acid (PAA) or its salt, and polyvinyl alcohol (PVA). These may be used singly or in combinations of two or more thereof.

The positive electrode 11 of the present embodiment can be obtained by, for example, applying the positive electrode mixture slurry including a positive electrode active material, a conductive agent, a binder, and others to a positive electrode current collector, drying the resultant coating to form a positive electrode mixture layer, and pressing the positive electrode mixture layer.

[Negative Electrode]

The negative electrode 12 comprises a negative electrode current collector and a negative electrode mixture layer formed on the negative electrode current collector, for example. As the negative electrode current collector, foil of a metal that is stable in the electric potential range of the negative electrode, such as copper, a film with such a metal disposed as an outer layer, or the like can be used. The negative electrode mixture layer includes, for example, a negative electrode active material, and a binder and others as optional components.

The negative electrode active material is not particularly limited as long as it is a material capable of intercalating and deintercalating lithium ions, and examples thereof include metal lithium; lithium alloys such as lithium/aluminum alloy, lithium/lead alloys, lithium/silicon alloys, and lithium/tin alloys; carbon materials such as graphite, graphite fluoride, coke, and calcined products of organic matters; metal oxides such as $SnO_2$, SnO, and $TiO_2$. These may be used singly or in combinations of two or more thereof.

Examples of the binder to be used include fluororesin such as polyvinylidene fluoride (PVdF), PAN, polyimide resin, acrylic resin, polyolefin resin, styrene-butadiene rubber (SBR), carboxymethyl cellulose (CMC) or a salt thereof, polyacrylic acid (PAA) or a salt thereof, and polyvinyl alcohol (PVA), as in the positive electrode. These may be used singly or in combinations of two or more thereof.

The negative electrode 12 of the present embodiment can be obtained by, for example, applying the a negative electrode mixture slurry including a negative electrode active material, a binder, and others to a negative electrode current collector, drying the resultant coating to form a negative electrode mixture layer, and pressing the negative electrode mixture layer.

[Separator]

For example, an ion-permeable and insulating porous sheet is used as the separator 13. Specific examples of the porous sheet include a microporous thin film, woven fabric, and nonwoven fabric. Suitable examples of the material for the separator 13 include olefin resins, such as polyethylene and polypropylene, and cellulose. The separator 13 may be a laminate including a cellulose fiber layer and a layer of fibers of a thermoplastic resin such as an olefin resin. The separator 13 may be a multi-layered separator including a polyethylene layer and a polypropylene layer. The surface of the separator 13 to be used may be coated with a material, such as an aramid resin or ceramic.

EXAMPLES

Hereinafter, the present disclosure will be described in more details by way of Examples, but the present disclosure is not limited to these Examples.

[Preparation of Lithium/Nickel Complex Oxides A1 to A5]

A nickel compound having a density shown in Table 1 and a lithium compound were mixed, and the mixture was then fired in an oxygen atmosphere at a low temperature of 200° C. to 400° C. for 1 to 3 hours and then fired at a high temperature shown in Table 1 to thereby produce each of lithium/nickel complex oxides A1 to A5. The total firing time including the firing time at low temperature and the firing time at high temperature was as shown in Table 1.

[Preparation of Lithium/Nickel Complex Oxides B1 to B6]

A nickel compound having a density shown in Table 1 and a lithium compound were mixed, and then, without undergoing firing at low temperature, the mixture was fired in an oxygen atmosphere at a high temperature shown in Table 1 to thereby produce each of lithium/nickel complex oxides B1 to B6.

TABLE 1

| Lithium/<br>Nickel<br>Complex<br>Oxide | Density of<br>Nickel<br>Compound<br>(g/cm³) | Firing<br>at Low<br>Temperature | Temperature<br>in Firing<br>at High<br>Temperature<br>(° C.) | Total<br>Firing Time<br>(hr) |
|---|---|---|---|---|
| A1 | 1.31 | Yes | 750 | 20 |
| A2 | 1.31 | Yes | 750 | 22 |
| A3 | 1.31 | Yes | 750 | 24 |
| A4 | 1.21 | Yes | 780 | 20 |
| A5 | 1.21 | Yes | 800 | 20 |
| B1 | 1.54 | No | 750 | 20 |
| B2 | 1.54 | No | 800 | 20 |
| B3 | 1.36 | No | 750 | 20 |
| B4 | 1.36 | No | 770 | 20 |
| B5 | 1.54 | No | 770 | 20 |
| B6 | 1.54 | No | 760 | 20 |

For the lithium/nickel complex oxides A1 to A5 and B1 to B6, the average particle size and the standard deviation of the particle size distribution of the primary particles were determined. The method for the determination was as described hereinabove. The particle size of the largest coarse primary particle in the primary particles was determined, and the parameter α was determined using the following equation (1):

$$\alpha = (d_{max} - d)/\sigma \quad (1)$$

$d_{max}$: particle size of coarse primary particle
d: average particle size of primary particles
σ: standard deviation of the particle size distribution of primary particles The results of the average particle size of the primary particles and the parameter α of each lithium/nickel complex oxide are shown in Table 2. A parameter α larger than 6 indicates that a coarse primary particle having a particle size larger than the average particle size of the primary particles, d, plus 6σ is present.

TABLE 2

| Lithium/<br>Nickel<br>Complex<br>Oxide | Average<br>Particle Size of<br>Primary Particles<br>(μm) | Parameter α<br>Determined<br>using Equation (1) | Average<br>Particle Size of<br>Secondary Particles<br>(μm) |
|---|---|---|---|
| A1 | 0.78 | 6.1 | 11.8 |
| A2 | 0.77 | 10.2 | 11.9 |
| A3 | 0.80 | 14.3 | 12.1 |
| A4 | 4.30 | 6.3 | 25.8 |
| A5 | 9.90 | 6.8 | 31.3 |
| B1 | 0.76 | 2.8 | 11.5 |
| B2 | 9.70 | 2.9 | 31.1 |
| B3 | 0.79 | 4.3 | 11.9 |
| B4 | 0.82 | 5.5 | 12.4 |
| B5 | 4.10 | 2.4 | 26.5 |
| B6 | 1.63 | 2.9 | 12.4 |

As clear from Table 2, all of lithium/nickel complex oxides A1 to A5 have a parameter α larger than 6, the parameter α determined using the equation (1), and therefore include a secondary particle in which a coarse primary particle having a particle size $d_{max}$ larger than d+6σ is present. In contrast, all of lithium/nickel complex oxides B1 to B6 have a parameter α of 6 or less, the parameter α determined using the equation (1), and therefore include no secondary particle in which a coarse primary particle having a particle size larger than d+6σ is present. Hereinafter, batteries were prepared using these lithium/nickel complex oxides, and heat stability and the characteristic thereof at a low temperature were evaluated.

Example 1

[Preparation of Positive Electrode]

The lithium/nickel complex oxide A1 was used as a positive electrode active material. The lithium/nickel complex oxide A1, carbon black as a conductive agent, and aqueous dispersion of polytetrafluoroethylene as a binder were mixed in a mass ratio in terms of solids contents of 100:3:10, and then the mixture was suspended in an aqueous solution of carboxymethyl cellulose to thereby prepare a positive electrode mixture slurry. The positive electrode mixture slurry was applied to both sides of aluminum foil as a positive electrode current collector having a thickness of 30 μm to a total thickness of 230 μm, and the resultant was dried. After drying, the resultant was pressed with a mill roll to a total thickness of 180 μm and then cut into a predetermined size to thereby obtain a positive electrode. Then, an aluminum-made positive electrode lead was welded to the positive electrode current collector.

[Preparation of Negative Electrode]

Natural graphite as a negative electrode active material and a styrene-butadiene rubber-based binder as a binder were mixed in a mass ratio of 100:5 to prepare a negative electrode mixture slurry. The negative electrode mixture slurry was applied to both sides of copper foil having a thickness of 20 μm as a negative electrode current collector to a total thickness of about 230 μm, and the resultant was dried. After drying, the resultant was pressed to a density of 1.4 g/cc to 1.7 g/cc and then cut into a predetermined size to thereby obtain a negative electrode. Then, a nickel-made negative electrode lead was welded to the negative electrode current collector.

[Preparation of Non-Aqueous Electrolyte]

Ethylene carbonate (EC) and diethyl carbonate (DEC) were mixed in a molar ratio of 1:3, and $LiPF_6$ was dissolved in the resulting mixed solvent to a concentration of 1 mol/L to thereby prepare a non-aqueous electrolyte.

[Preparation of Non-Aqueous Electrolyte Secondary Battery]

The positive electrode and negative electrode were wound into a swirl shape together with a microporous polyethylene film having a thickness of 25 μm interposed therebetween as a separator to thereby prepare an electrode assembly. The electrode assembly and the non-aqueous electrolyte were together housed in a case body, and the opening of the case body was joined with a sealing assembly via a gasket interposed therebetween to thereby prepare a non-aqueous electrolyte secondary battery. The joining was carried out so as to reach a compressibility of the gasket of 30%. The resulting non-aqueous electrolyte secondary battery had a diameter of 18.0 mm, a total height of 65.0 mm, and a battery capacity of 3000 mAh.

Example 2

A non-aqueous electrolyte secondary battery was prepared in the same manner as in Example 1, except that the lithium/nickel complex oxide A2 was used as a positive electrode active material.

Example 3

A non-aqueous electrolyte secondary battery was prepared in the same manner as in Example 1, except that the lithium/nickel complex oxide A3 was used as a positive electrode active material.

Example 4

A non-aqueous electrolyte secondary battery was prepared in the same manner as in Example 1, except that the lithium/nickel complex oxide A4 was used as a positive electrode active material.

Example 5

A non-aqueous electrolyte secondary battery was prepared in the same manner as in Example 1, except that the lithium/nickel complex oxide A5 was used as a positive electrode active material.

Comparative Example 1

A non-aqueous electrolyte secondary battery was prepared in the same manner as in Example 1, except that the lithium/nickel complex oxide B1 was used as a positive electrode active material.

Comparative Example 2

A non-aqueous electrolyte secondary battery was prepared in the same manner as in Example 1, except that the lithium/nickel complex oxide B2 was used as a positive electrode active material.

Comparative Example 3

A non-aqueous electrolyte secondary battery was prepared in the same manner as in Example 1, except that the lithium/nickel complex oxide B3 was used as a positive electrode active material.

Comparative Example 4

A non-aqueous electrolyte secondary battery was prepared in the same manner as in Example 1, except that the lithium/nickel complex oxide B4 was used as a positive electrode active material.

Comparative Example 5

A non-aqueous electrolyte secondary battery was prepared in the same manner as in Example 1, except that the lithium/nickel complex oxide B5 was used as a positive electrode active material.

Comparative Example 6

A non-aqueous electrolyte secondary battery was prepared in the same manner as in Example 1, except that the lithium/nickel complex oxide B6 was used as a positive electrode active material.

[Evaluation of Low Temperature Characteristic]

Each of the batteries of Examples and Comparative Examples were charged at a constant current of 0.5 mA/cm² to reach a battery voltage of 4.2 V. Then, in an environment at 25° C. or 0° C. as an environment for measurement, the battery was discharged at a constant current of 0.5 mA/cm² to reach a battery voltage of 2.5 V. The discharge capacity in the environment at 25° C. is designated as A, and the discharge capacity in the environment at 0° C. is designated as B. The characteristic at a low temperature (%) was calculated using the equation below. The results are shown in Table 3.

$$\text{Characteristic at Low Temperature (\%)} = B/A \times 100$$

[Evaluation of Heat Stability of Lithium/Nickel Complex Oxide]

In an environment at 25° C., each of the non-aqueous electrolyte secondary batteries of Examples and Comparative Examples were charged at a constant current of 0.5 mA/cm² to reach a battery voltage of 4.2 V. The battery was then disassembled to take the positive electrode out. Then, 1 mg of the positive electrode mixture layer was scraped and kept with 1 μL of the non-aqueous electrolyte in a sealed pressure-resistant container, which was used as a measurement sample. The temperature of the measurement sample was raised from 25° C. to 550° C. at a rate of temperature rise of 10° C./min using a differential scanning calorimeter (DSC) to measure the exotherm onset temperature. The results were shown in Table 3. A higher exotherm onset temperature means higher heat stability.

TABLE 3

| | Lithium/Nickel Complex Oxide | | | |
|---|---|---|---|---|
| | Average Particle Size of Primary Particles (μm) | Parameter α Determined using Equation (1) | Characteristic at Low Temperature (%) | Exotherm Onset Temperature (° C.) |
| Example 1 | 0.78 | 6.1 | 91.1 | 225 |
| Example 2 | 0.77 | 10.2 | 91.5 | 228 |
| Example 3 | 0.80 | 14.3 | 91.8 | 229 |
| Example 4 | 4.30 | 6.3 | 90.8 | 231 |
| Example 5 | 9.90 | 6.8 | 87.8 | 232 |
| Comparative Example 1 | 0.76 | 2.8 | 91.0 | 212 |
| Comparative Example 2 | 9.70 | 2.9 | 82.2 | 223 |
| Comparative Example 3 | 0.79 | 4.3 | 90.1 | 214 |
| Comparative Example 4 | 0.82 | 5.5 | 89.2 | 218 |
| Comparative Example 5 | 4.10 | 2.4 | 83.2 | 222 |
| Comparative Example 6 | 1.63 | 2.9 | 84.1 | 220 |

Examples 1 to 3 and Comparative Examples 1, 3, and 4, in which the average particle size of primary particles was less than 1 μm, are compared to each other. In Examples 1 to 3, in which a lithium/nickel complex oxide including a secondary particle in which a coarse primary particle having a particle size larger than d+6σ was present (i.e., α was larger than 6) was used, a poor characteristic at a low temperature was prevented and also heat stability was improved, compared to Comparative Examples 1, 3, and 4, in which a lithium/nickel complex oxide without such a secondary particle was used. Examples 4 and 5 and Comparative Examples 2, 5, and 6, in which the average particle size of primary particles was 1 μm or more, are compared to each other. In Examples 4 and 5, in which a lithium/nickel complex oxide including a secondary particle in which a coarse primary particle having a particle size larger than d+6σ was present (i.e., α was larger than 6) was used, a poor characteristic at a low temperature was prevented and also heat stability was improved, compared to Comparative Examples 2, 5, and 6, in which a lithium/nickel complex oxide without such a secondary particle was used. In Examples and Comparative Examples, when the average particle size of primary particles is increased (for example, from less than 1 μm to 1 μm or more), heat stability tends to be improved but the characteristic at a low temperature tends to be worsened. However, the extent of the worsening of the characteristic at a low temperature due to increase in the average particle size of primary particles was moderated in Examples, in which a lithium/nickel complex oxide including a secondary particle in which a coarse primary particle having a particle size larger than d+6σ was present was used, compared to Comparative Examples, in which a lithium/nickel complex oxide without such a secondary particle was used.

REFERENCE SIGNS LIST 10 non-aqueous electrolyte secondary battery
11 positive electrode
12 negative electrode
13 separator
14 electrode assembly
15 battery case
16 case body
17 sealing assembly
18, 19 insulating plate
20 positive electrode lead
21 negative electrode lead
22 projecting portion
23 filter
24 lower vent member
25 insulating member
26 upper vent member
27 cap
28 gasket
30 lithium complex oxide
32 primary particle
32a coarse primary particle
34 secondary particle

The invention claimed is:

1. An non-aqueous electrolyte secondary battery including a positive electrode, a negative electrode, and a non-aqueous electrolyte, the positive electrode including a positive electrode current collector and a positive electrode mixture layer located on the positive electrode current collector,
wherein the positive electrode mixture layer includes a lithium complex oxide in a form of secondary particles, each of the secondary particles being agglomerated primary particles, and
the secondary particles include a secondary particle in which a coarse primary particle having a particle size larger than d+6σ is present, wherein d represents an average value of particle sizes of the primary particles and σ represents a standard deviation of a particle size distribution of the primary particles, wherein particle size is defined as a length of the primary particle in the major axis direction.

2. The non-aqueous electrolyte secondary battery according to claim 1, wherein the lithium complex oxide includes a lithium/nickel complex oxide represented by $Li_xNi_yM_{(1-y)}O_2$, wherein $0.95 \leq x \leq 1.10$, $0.65 \leq y \leq 1.0$, and M is at least one element selected from the group consisting of Co, Mn, Al, Mg, Ti, Sr, Zr, Y, Mo, and W.

3. The non-aqueous electrolyte secondary battery according to claim 1, wherein the average value of the particle sizes of the primary particles, d, is 0.3 μm to 2.0 μm.

4. The non-aqueous electrolyte secondary battery according to claim 1, wherein the particle size of the coarse primary particle is larger than d+10.

5. The non-aqueous electrolyte secondary battery according to claim 1, wherein the particle size of the coarse primary particle is larger than d+14σ.

6. The non-aqueous electrolyte secondary battery according to claim 1, wherein a number of the coarse primary particles present in the secondary particle is 1 to 3.

7. The non-aqueous electrolyte secondary battery according to claim 1, wherein each of the secondary particles is composed of 300 to 1000 primary particles.

8. The non-aqueous electrolyte secondary battery according to claim 1, wherein an average particle size of the secondary particles is within the range from 3 μm to 20 μm.

\* \* \* \* \*